United States Patent [19]

Chou et al.

[11] 4,374,953

[45] Feb. 22, 1983

[54] METHOD FOR PREPARING POLYACETALS AND POLYKETALS BY EMULSION POLYMERIZATION

[75] Inventors: Yungnien J. Chou; John C. Saam, both of Midland, Mich.

[73] Assignee: Dow Corning Corporation, Midland, Mich.

[21] Appl. No.: 369,690

[22] Filed: Apr. 19, 1982

[51] Int. Cl.³ .......................... C08F 8/28; C08L 61/00
[52] U.S. Cl. .................................... 525/153; 525/154; 528/222; 528/223; 528/224; 528/232; 528/242; 528/243
[58] Field of Search ............... 528/222, 223, 224, 232, 528/242, 243; 525/153, 154

[56] References Cited

U.S. PATENT DOCUMENTS

| | | | |
|---|---|---|---|
| 2,071,252 | 2/1937 | Carothers | 260/151 |
| 2,895,945 | 7/1959 | Fischer et al. | 525/154 |
| 2,944,989 | 7/1960 | Harvey et al. | 525/153 |
| 2,963,464 | 12/1960 | Cohen et al. | 260/67 |
| 3,048,560 | 8/1962 | Markhart et al. | 525/154 |
| 3,075,935 | 1/1963 | De Shay | 525/153 |

*Primary Examiner*—Lucille M. Phynes
*Attorney, Agent, or Firm*—Robert Spector

[57] ABSTRACT

Polyacetals and polyketals are prepared by reacting emulsified carbonyl compounds with emulsified polyfunctional alcohols in aqueous media and in the presence of specified polycondensation catalysts. Coherent films of the resultant polymers can be applied to substrates from aqueous or non-aqueous media.

37 Claims, No Drawings

METHOD FOR PREPARING POLYACETALS AND POLYKETALS BY EMULSION POLYMERIZATION

BACKGROUND OF THE INVENTION

This invention relates to the preparation of synthetic organic polymers. More particularly, this invention relates to the preparation of polyacetals and polyketals in aqueous media containing emulsified aldehydes or ketones and polyfunctional alcohols.

Polyacetals and polyketals are particularly preferred classes of condensation polymers because their properties make them suitable for a variety of end-use applications including films, coatings and engineering plastics. By judiciously selecting monomers and polymerization conditions, it it possible to optimize those properties desired for a particular end use.

A conventional method for preparing polyacetals and polyketals is by the reaction of the appropriate mono- or difunctional carbonyl compound with a polyfunctional alcohol. It has been reported by Hill et al [J.A.C.S. 45, 3124 (1923)] that the acid catalyzed reaction of acetaldehyde with diols containing up to 6 carbon atoms yields cyclic acetals. The reaction products of acetaldehyde with octamethylene glycol and decamethylene glycol are reportedly viscous, non-distillable syrups which were presumed to be linear polymers. In all instances the reactants were heated in the presence of a catalytic amount of sulfuric acid without employing any diluents. The authors report that the polyacetals were readily hydrolyzed in the presence of dilute mineral acids to yield the corresponding aldehyde and difunctional alcohol.

U.S. Pat. No. 2,071,252 to Carothers discloses the production of linear polyacetals by the reaction of certain difunctional alcohols with acetals derived from relatively low molecular weight monofunctional alcohols and a variety of aldehydes. The reactions were conducted at the boiling point of the reaction mixture and the low molecular weight alcohol produced as a by-product of the reaction was continuously removed by distillation. This reference also teaches that in some instances the initial acetal can be prepared in situ by heating a mixture containing the desired aldehyde, monofunctional and difunctional alcohols and a suitable catalyst. Some of the polyacetals, for example the one derived from 1,10-decanediol and formaldehyde, are solid materials exhibiting melting points below 100° C. These materials were further polymerized in a molecular still to yield a residue of a fiber-forming material and up to 50% by weight of a distillate corresponding to a cyclic dimer, which reportedly resulted from some decomposition of the initial reaction mixture. This method is less than desirable since it requires using a monofunctional alcohol that must subsequently be distilled from the reaction mixture. In addition, distillation of the alcohol requires that the reaction mixture be heated to the boiling point, which necessitates a considerable expenditure of energy. The products of the final polymerization reaction are viscous liquids or solids, both of which would be difficult to remove from the reaction vessel and purify, particularly if commercial scale quantities of reactants were used.

U.S. Pat. No. 2,963,464 to Cohen et al. discloses the reaction of pentaerythritol and/or dipentaerythritol with difunctional aldehydes to form polyspiranes. The reaction is conducted in the presence of an acidic catalyst and an inert liquid that is a solvent for at least one of the reactants. One example in this patent describes the product obtained by reacting pentaerythritol and glutaraldehyde in boiling water using dodecylbenzenesulfonic acid as the catalyst. The product is reportedly a solid which did not melt below 300° C., was soluble in a mixture of isomeric cresols and insoluble in water and all of the common non-phenolic organic solvents tested. Such a product would be of relatively little commercial value, since it could only be processed as a solution in a phenolic solvent. Phenols and certain derivatives thereof are undesirable solvents due to their odor, volatility, toxicity and relatively poor oxidative stability. Present legislation limiting environmental pollution to specified levels would make it very difficult to conduct a commercial scale process for transforming bulk polymer into shaped articles or incorporating the polymer into a coating formulation using phenol or the isomeric cresoles as a solvent.

One objective of the present invention is to provide a commercially feasible method for preparing polyacetals and polyketals of useful molecular weight.

A second objective of this invention is to provide polyacetal and polyketal compositions that can readily be employed for a variety of end uses while avoiding the potential environmental pollution problems associated with the use of organic solvents.

It is known that the reaction between a monofunctional alcohol and a carbonyl compound to form an acetal or ketal involves an equilibrium that can be represented by the equation.

In the foregoing equation R and R' are hydrocarbyl groups and R" is hydrogen or a hydrocarbyl group. The prior art teaches that removal of at least one of the two products from the liquid phase of the reaction mixture is essential to avoid hydrolysis of the acetal or ketal, particularly in acidic media. This requirement also applies to the production of polymeric compounds, the only difference being that the alcohol represented by ROH in the foregoing equation is polyfunctional.

A disadvantage associated with preparing polyacetals and polyketals by conventional bulk polymerization techniques is that the high viscosity exhibited by products which are liquid or semi-solid at ambient temperature would make these products difficult to transfer and process. Solid products could require mechanical processing to break up large pieces in order to remove them from the reactor.

One method for avoiding the problems associated with the manufacture and processing of relatively high molecular weight polymers in molten or solubilized form is to employ a technique known as emulsion polymerization whereby one or more monomers are reacted in an aqueous medium containing a catalyst and, usually, a surfactant. The final polymer is obtained as an aqueous emulsion or latex exhibiting a relatively low viscosity which sometimes approaches that of water. Heretofore emulsion polymerization employing water as the continuous phase has been employed substantially exclusively for the polymerization of ethylenically unsaturated compounds in the presence of free radical sources, such as organic perixodes. Since polyacetals and polyketals are susceptible to hydrolysis, particularly in the presence of acidic catalysts, emulsion polymerization in aqueous media has heretofore not been considered a practical means for preparing polyacetals and polyketals in general, and particularly those derived from monofunctional aldehydes or ketones.

It is known to prepare certain types of condensation polymers, particularly polyamides, by interfacial polymerization. In accordance with this method, an aqueous phase containing a solubilized or emulsified diamine such as hexamethylene diamine, usually in the form of the corresponding sodium salt, is combined with a water-immiscible organic liquid such as methylene chloride containing a solubilized diacyl halide such as sebacoyl dichloride. At relatively low temperatures a rapid, and in some cases instantaneous, formation of solid polymer occurs at the interface between the two liquid layers. If the reaction is to proceed to completion, the polymer must be continuously removed from the area of the interface by stirring the reaction mixture or by withdrawing the polymer from the interfacial region as the reaction progresses.

Interfacial polymerization has not heretofore been employed for the production of polyacetals and polyketals because the rate of reaction of polyfunctional alcohols with carbonyl compounds is considerably slower than the rate of reaction of alcohols or amines with acyl halides. The acyl halides react so rapidly that no catalyst is required. By comparison, the reaction of carbonyl compounds with polyhydric alcohols requires a catalyst to achieve a useful reaction rate.

Since both interfacial polymerization, as it has been applied to the formation of polyamides, and emulsion polymerization employ an aqueous phase, this relatively large amount of water could be expected to displace the equilibrium of the aldehyde-alcohol reaction in the direction of hydrolysis of any soluble polyacetal formed to the corresponding polyfunctional aldehyde and alcohol, particularly in the presence of acidic catalysts. It is therefore not obvious to employ either of these techniques as a means for preparing commercially useful polyacetals that are even slightly soluble in the reaction medium.

Surprisingly it has now been found that polyacetals and polyketals wherein the average number of repeating units per molecule is as high as 20 or more can be prepared by emulsion polymerization in aqueous media and in the presence of specified polycondensation catalysts.

SUMMARY OF THE INVENTION

This invention provides a method for preparing polyacetals and polyketals in aqueous media by reacting (1) emulsified carbonyl compounds or reaction products of carbonyl compounds and water-soluble monofunctional alcohols with (2) emulsified polyfunctional alcohols or hydrolyzable esters thereof in the presence of specified polycondensation catalysts.

DETAILED DESCRIPTION OF THE INVENTION

This invention provides a method for preparing polyacetals and polyketals by emulsion polymerization, said method comprising the steps of (1) emulsifying in an aqueous medium a mixture comprising
  (a) at least one reagent containing at least 5 carbon atoms and 2 or more hydroxyl groups or 2 or more esterified hydroxyl groups of the formula RCOO—where R is alkyl and contains from 1 to 3 carbon atoms and hydroxyl or esterified hydroxyl groups are bonded to aliphatic or cycloaliphatic carbon atoms,
  (b) at least one carbonyl compound containing at least 5 carbon atoms or a reaction product of said carbonyl compound and a water-soluble monofunctional alcohol containing from 1 to 3 carbon atoms, said carbonyl compound being selected from the group consisting of mono- and polyfunctional aldehydes and mono- and polyfunctional ketones wherein the carbonyl groups of said carbonyl compound are bonded to aliphatic or cycloaliphatic carbon atoms, and
  (c) at least one polycondensation catalyst in an amount effective to accelerate the rate of reaction of (a) with (b), and
(2) thereafter allowing (a) and (b) to react until the desired product is obtained.

This invention further provides polyacetals and polyketals that have been prepared in accordance with the foregoing method.

In accordance with the method of this invention, at least one emulsified polyfunctional alcohol, or an ester thereof derived from a water-soluble carboxylic acid, is reacted with at least one emulsified monocarbonyl compound and/or at least one dicarbonyl compound. In place of any mono- or dicarbonyl compound, one may employ a reaction product of the carbonyl compound with a water-soluble monofunctional alcohol.

Polyfunctional alcohols that can be reacted to form polyacetals and polyketals in accordance with the method of this invention contain at least five carbon atoms and two or more hydroxyl groups or hydrolyzable esterified hydroxyl groups where the acid portion of the ester is derived from a water-soluble monofunctional carboxylic acid. It has been found that alcohols containing fewer than five carbon atoms are usually too soluble in water to form emulsions even in the presence of relatively water-insoluble carbonyl compounds.

The hydroxyl groups of the compound or polymer employed to react with the carbonyl compound can be initially present either in the unreacted form or the hydroxyl groups can be esterified with a monofunctional, water-soluble carboxylic acid such as acetic acid. The ester is readily hydrolyzed in the aqueous media employed to prepare the polymers of this invention, particularly if catalytic amounts of acidic or basic materials are present in the reaction mixture. Since strong acids such as sulfuric acid and the sulfonic acids are effective catalysts for preparing polyacetals and polyketals in accordance with the method of this invention, it is preferable to employ these catalysts when the polyfunctional hydroxyl compound is added to the reaction mixture in the form of an ester such as polyvinyl acetate. Alternatively the ester can be hydrolyzed in a basic aqueous medium, such as dilute aqueous sodium hydroxide. The base is subsequently neutralized using a stoichiometric excess of one of the acid catalysts of this invention, for example dodecylbenzenesulfonic acid, or other suitable acid.

The polyfunctional alcohol can be represented by the formula HOR$^1$OH, where R$^1$ represents hydrocarbylene containing 5 or more carbon atoms or a series of at least two hydrocarbylene groups joined by a linking group. Preferred linking groups include

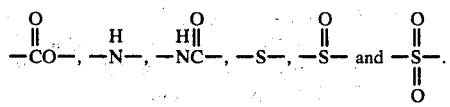

The R[1] group is bonded to the two hydroxyl groups shown in the formula through an aliphatic or cycloaliphatic carbon atom.

In addition to the two hydroxyl groups shown in the preceding formula, R[1] may contain one or more additional hydroxyl groups and/or other substituents that are reactive or non-reactive under the conditions employed to prepare polyacetals and polyketals in accordance with the method of this invention. Inert substituents include nitro, halo, hydrocarbyloxy and thiohydrocarbyloxy. The halo substituents can be chloro, bromo or iodo.

Potentially reactive substituents include carboxy (—COOH), hydroxyl, isocyanato (—N=C=O), which may be free or blocked, and amino. Depending upon the stoichiometry of the reagents and the reaction conditions during the emulsion polymerization, reactive substituents on one polymer molecule may react with groups on adjacent polymer molecules during the course of the polymerization to form a slightly cross-linked structure that is desirable for certain coating applications.

Alternatively, a potentially reactive group can be retained throughout the polymerization. This group is subsequently reacted with an appropriate polyfunctional reagent such as melamine or a derivative thereof to form the crosslinked polymer structure desirable for certain end use applications, such as solvent resistant coatings.

In a narrower embodiment of this invention, R[1] represents (a) unsubstituted or substituted alkylene containing from 5 to 20 carbon atoms, (b) unsubstituted or substituted alkenylene containing from 5 to 20 carbon atoms, (c) unsubstituted or substituted cycloalkylene containing from 5 to 8 carbon atoms, (d) —C$_m$H$_{2m}$DC$_n$H$_{2n}$— where D represents cycloalkylene containing from 5 to 8 carbon atoms or arylene and m and n are individually selected integers from 1 to 8 inclusive, or

   (e)

where R[2] is alkylene containing from 2 to 20 carbon atoms, R[3] is hydrocarbylene containing from 2 to 20 carbon atoms and r is an integer from 1 to 20.

In preferred embodiments of this invention R[1] is alkylene containing from 8 to 20 carbon atoms,

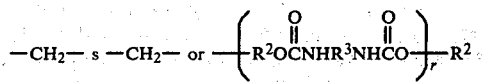

where R[2] is alkylene containing from 2 to 12 carbon atoms; R[3] is alkylarylene most preferably ortho- or para-tolylene; and r is as previously defined.

The preference for certain reagents is based on their availability and cost and/or the ease of preparing useful polyacetals by emulsion polymerization using these reagents.

Representative polyfunctional alcohols that can be reacted in accordance with the present method include 1,6-hexanediol, 1,8-octanediol, 1,10-decanediol, 1,12-dodecanediol, the isomeric cyclohexanediols, 1,2-and 1,4-bis(hydroxymethyl)cyclohexane, 1,2-and 1,4-benxenedimethanol, pentaerythritol, dipentaerythritol mannitol and sorbitol. Preferred polyfunctional alcohols include 1,10-decanediol, pentaerythritol and oligomeric reaction products of styrene and allyl alcohol.

Another type of polyfunctional alcohol that will form polymeric acetals or ketals when reacted with a carbonyl compound in accordance with the present method are oligomeric compounds prepared by reacting a stoichiometric excess of a di- or polyfunctional alcohol with a di- or polyfunctional reagent that will react with alcohols to form chemical bonds. The resultant oligomer contains hydroxyl end groups and is subsequently reacted with a mono- or polyfunctional carbonyl compound. In a preferred embodiment of this type of alcohol, a diisocyanate is reacted with a stoichiometric excess of ethylene glycol. The resultant hydroxyl-terminated oligomer contains internal urethane linkages,

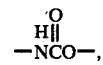

and is subsequently emulsified together with a stoichiometric amount of an aldehyde such as any of the isomeric heptaldehydes or a ketone such as 2,3-pentanedione and a polycondensation catalyst. The resultant composition is then reacted in accordance with the method of this invention to yield a urethane-modified polyacetal or polyketal.

Preformed oligomers can also be employed when it is desired to use water soluble, nonemulsifiable polyfunctional alcohols or carbonyl compounds for an emulsion polymerization in accordance with this invention. In these instances the water-soluble alcohol or carbonyl compound is reacted with an appropriate reagent to form a low molecular weight, emulsifiable hydroxyl-terminated oligomer containing an average of from about 2 to 5 repeating units per molecule. The oligomer is then emulsified together with a mono- or polyfunctional carbonyl compound and reacted in accordance with the present method.

Polymers containing at least two pendant and/or terminal hydroxyl groups or hydrolyzable ester groups per molecule can be employed to prepare polyacetals and polyketals using the method of this invention if the polymer can be emulsified. A preferred class of emulsifiable polymers are the poly(vinyl carboxylates) such as polyvinyl acetate wherein the acid portion of the ester contains from 1 to 3 carbon atoms. Copolymers of these vinyl carboxylates with other ethylenically unsaturated compounds such as ethylene and styrene are also suitable. The ester groups are readily hydrolyzed in the aqueous reaction medium in the presence of one of the acidic polycondensation catalysts of this invention. The resultant polymer contains a plurality of hydroxyl groups and will react with emulsified monofunctional aldehydes or ketones that are present in the reaction mixture to form cross-linked structures, since each molecule of carbonyl compound can react with two hydroxyl groups. In some instances the cross-linked reaction product is present as an emulsion that forms a coherent, adhesive film following evaporation of the water. The resultant film is not soluble or dispersable in water or common organic solvents and exhibits the elasticity characteristic of a cross-linked polymer. This elasticity is not exhibited by films prepared form the initial poly(vinyl carboxylate).

Carbonyl compounds that can be reacted with polyfunctional alcohols to form polyacetals and polyketals in accordance with the method of this invention include mono- and polyfunctional aldehydes, mono- and polyfunctional ketones and reaction products of these aldehydes and ketones with water soluble, monofunctional alcohols containing from 1 to 3 carbon atoms. Typical water-soluble alcohols include methanol, ethanol and the isomeric propanols.

The aforementioned aldehydes and ketones can be represented by the formulae $R^4R^5C{=}O$ and $$R^6CR^7\left(CR^8\right)_q$$
(with carbonyl oxygens)

where $R^4$ is hydrocarbyl or substituted hydrocarbyl; $R^5$, $R^6$ and $R^8$ are hydrogen, hydrocarbyl or substituted hydrocarbyl; $R^7$ is hydrocarbylene, and q represents an integer having a value of 1 or greater, with the provisos that all carbonyl groups are bonded to aliphatic or cycloaliphatic carbon atoms and all aldehydes and ketones contain 5 or more carbon atoms.

The substituents which can be present on $R^4$, $R^5$, $R^6$ and $R^8$ have previously been discussed in connection with the definition of the hydrocarbylene group of the polyfunctional alcohol represented by $R^1$ in the foregoing formula.

In a narrower embodiment of this invention $R^4$ represents unsubstituted or substituted alkyl containing from 1 to 20 carbon atoms, unsubstituted or substituted alkenyl containing from 2 to 20 carbon atoms or unsubstituted or substituted cycloalkyl containing from 5 to 8 carbon atoms; $R^5$, $R^6$ and $R^8$ are hydrogen or are selected from the same group as $R^4$; and $R^7$ represents unsubstituted or substituted alkylene containing from 1 to 20 carbon atoms, with the proviso that any aldehyde or ketone must contain at least 5 carbon atoms.

In the foregoing definitions for $R^4$, $R^5$, $R^6$ and $R^8$, any cycloalkylene is preferably 1,2-or 1,4-cyclohexylene.

In preferred embodiments, q is 1, $R^4$ is alkyl containing from 2 to 20 carbon atoms or alkenyl containing from 2 to 20 carbon atoms, with the proviso that $R^4$ contains 4 or more carbon atoms when $R^5$ represents a hydrogen atom; $R^5$ is hydrogen or is selected from the same group as $R^4$; $R^7$ is alkylene containing from 6 to 20 carbon atoms when $R^6$ and $R^8$ are hydrocarbyl or substituted hydrocarbyl.

Most preferably $R^4$ represents alkyl containing from 4 to 12 carbon atoms and $R^7$ is alkylene containing from 6 to 12 carbon atoms.

Representative emulsifiable aldehydes that can be reacted directly with emulsifiable polyfunctional alcohols to form polymeric materials in accordance with the method of this invention contain one or more carbonyl groups, from five to twenty or more carbon atoms and include pentanal, hexanal, heptanal, 2,4-hexadien-l-al, decanal, eicosanal, cyclohexanal, diphenylacetaldehyde and cinnamaldehyde in addition to the isomeric hexanedials, decanedials and cyclohexanedials.

Representative emulsifiable ketones include 2-and 3-pentanone and isomeric higher aliphatic ketones containing up to 20 carbon atoms, cyclohexanone, 2,4-pentanedione, 2,3-hexanedione, 1,4-cyclohexanedione, 3-ethyl-5,5-dimethyl-2,4-oxazolidinedione (ethadione) and other heterocyclic non-aromatic ketones.

It should be understood that the term "hydrocarbyl" as used in this specification includes all monovalent groups that can be obtained by removing a hydrogen atom from a non-aromatic carbon atom of a hydrocarbon compound containing up to 20 carbon atoms. When the hydrocarbyl group is alkyl, it can be linear or branched. Representative alkyl groups include methyl, ethyl, propyl, n-butyl, isobutyl, amyl, and the isomeric hexyl, octyl, decyl, dodecyl, and octadecyl groups. When the hydrocarbyl is cycloalkyl it can be, for example, cyclohexyl, cycloheptyl or cyclooctyl. Other suitable hydrocarbyl groups include

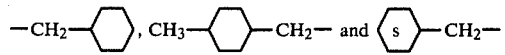

The term "hydrocarbylene" includes all the divalent groups obtained when a second hydrogen atom is removed from any of the groups encompassed by the foregoing definition for "hydrocarbyl."

In accordance with the method of this invention, the reaction of (1) the aforementioned carbonyl compounds and polyfunctional alcohols and/or (2) suitable derivatives of the carbonyl compounds and alcohols, as previously defined, is conducted in the presence of a suitable polycondensation catalyst. Suitable catalysts include strong mineral acids, such as hydrochloric, sulfuric, nitric and phosphoric acids. Other suitable polycondensation catalysts include sulfonic acids, mono- and diesters of sulfuric acid, alkali metal salts of sulfuric acid monoesters wherein the alcohol residue contains at least 12 carbon atoms, alkali metal salts and esters of sulfonic acids and mixtures comprising (a) at least one component selected from mono- and diesters of sulfuric acid, alkali metal salts of sulfuric acid monoesters wherein the alcohol residue contains at least 12 carbon atoms and cationic surfactants and (b) at least one compound selected from the alkali metal salts of sulfuric acid.

Preferably the polycondensation catalyst is selected from the group consisting of sulfuric acid, hydrochloric acid, phosphoric acid, aliphatic and aromatic sulfonic acids, mono- and diesters of sulfuric acid, alkali metal salts of aromatic sulfonic acids, and mixtures of alkali metal salts of sulfuric acid with cationic surfactants.

Representative members from the foregoing classes of preferred polycondensation catalysts include dodecylbenzenesulfonic acid, lauryl hydrogen sulfate, sodium lauryl sulfate, sodium p-dodecylbenzene sulfonate, p-toluenesulfonic acid, trifluoromethanesulfonic acid, 5-methylnaphthylenesulfonic acid, p-dodecylbenzenesulfonic acid, dodecyl diphenyl oxide sulfonic acid, hydrochloric acid, sulfuric acid and phosphoric acid. Mineral acids such as sulfuric acid are desirably used in combination with surfactants such as hexadecyltrimethylammonium p-toluenesulfonate or an alkylphenoxy polyoxyethylene ethanol which is available under the trade name Makon(®) 10 from the Stepan Chemical Company, Northfield, Illinois 60093.

Representative sulfonic acids that are commercially available include methanesulfonic, trifluoromethanesulfonic, benezenesulfonic, dedecylbenzenesulfonic, dodecyl diphenyl oxide sulfonic, 5-methyl-l-naphthylene sulfonic and p-toluenesulfonic acids. A commercially available alkali metal sulfonic acid salt is sodium dodecylbenzene sulfonate.

Suitable esters of sulfuric acid include the lauryl, stearyl, hexadecyl and eicosanyl esters. These esters may contain one of two alcohol residues per molecule.

Cationic surfactants that can be used as one component of the aforementioned two-component catalyst mixtures include quaternary ammonium compounds wherein at least one hydrocarbyl group bonded to nitrogen contains eight or more carbon atoms and the anionic portion of the molecule is hydroxyl or is derived from a strong mineral acid such as sulfuric or hydrochloric acid. Preferably, the anionic portion is sulfate. Commercially available surfactants are listed in the 1980 edition of McCutcheon's Detergents and Emulsifiers, North American Editions, McCutcheon Division, Manufacturing Confectioner Publishing Company, Glen Rock, N.J. 07452.

When any of the aforementioned mixtures are employed as polycondensation catalysts the weight ratio of component (a) to the alkali metal sulfate can be in the range from 1000:1 to 1:300 respectively. Preferably the range is from 500:1 to 1:100, most preferably from 2:1 to 1:10.

A particularly preferred catalyst for many polymerization reactions is dodecylbenzenesulfonic acid, this preference being based on the availability and activity of this compound both as a catalyst and an emulsion stabilizer, and the desirable properties exhibited by the final polymer.

The polycondensation catalysts of this invention are used at concentration levels that will effectively catalyze the polymerization reaction and yield a product having a desired combination of properties. The optimum catalyst and concentration level for a given polymerization is dependent on a number of variables, including the types of monomers being reacted and the ultimate degree of polymerization desired. The catalysts are usually present at concentrations of from 0.01 to 30% by weight, based on total reactants. To achieve the desired degree of polymerization following a reaction time of 24 hours or less the catalyst concentration is preferably from 0.1 to 20%, most preferably from 0.5 to 10%.

In accordance with the present method for the preparation of polyacetals and polyketals by emulsion polymerization, a mixture comprising (1) at least one of the aforementioned mono- or polyfunctional carbonyl compounds or reaction products of these carbonyl compounds with water-soluble monofunctional alcohols, (2) at least one of the aforementioned polyfunctional alcohols or hydrolyzable esters thereof and (3) at least one polycondensation catalyst is emulsified in an aqueous medium. The resultant emulsion is then reacted at a temperature of from just above the freezing point to just below the boiling point of the emulsion until the desired polymer is obtained.

All of the reagents suitable for use in the method of this invention will form an emulsion when combined with water and one of the present polycondensation catalysts under the conditions to be employed for the polymerization reaction.

A simple test to determine whether a given reactant is emulsifiable is to combine the reactant in liquid form with sufficient water to achieve a concentration of from about 5 to about 80% by weight. Formation of a water-immiscible liquid phase indicates that the reactant can be polymerized in accordance with the method of this invention at the temperature of the aqueous medium employed to conduct the test. During this test the reactant may form a continuous nonaqueous phase, such as the one obtained by combining equal volumes of benzene and water, or the reactant may be present as a discontinuous phase, such as a dispersion or emulsion, within the aqueous phase. If only a single liquid phase appears to be present, the composition should be gradually cooled to just above its freezing point while being examined to detect formation of a water-insoluble phase. In some instances the particle size of the water-insoluble phase may be so small as to be detectable only by using a turbidometer or ultramicroscope. These and other techniques for detecting the presence of microscopic dispersed particles in a liquid medium are well known in the art, and do not form part of this invention. The presence of even microscopic particles of a water-insoluble liquid phase indicates that the reactant being evaluated will polymerize in accordance with the present method.

The foregoing test may not be applicable if one or more of the reactants melt at temperatures above about 100° C. In this instance some modification of the test and the general polymerization method may be necessary. In accordance with one such modification a small amount of a water-immiscible liquid in which the reactant is at least partially soluble is added to the water. Alternatively, an emulsion can sometimes be formed by heating a reactant above its melting point, combining the melt with warm water and passing the resultant composition through a homogenizer. These modifications would be obvious to one skilled in the art of preparing aqueous emulsions, and therefore are within the scope of the present method.

The desired reactants and polycondensation catalyst are emulsified by combining them with water. The amount of water is usually not critical so long as none of the reactants is appreciably soluble in water. It is usually convenient to employ sufficient water to achieve a reactant concentration of from about 5 to 80%, based on the total weight of the reaction mixture.

If the monomers, particularly the polyfunctional alcohol, are appreciably soluble in water, to achieve a sufficient concentration of these monomers in the emulsified phase, the combined monomer concentration in the reaction medium should be from about 40 to 80% by weight. This concentration range is usually appropriate for difunctional alcohols containing from 5 to about 9 carbon atoms.

Emulsification of the reactants can usually be achieved by stirring the mixture of reactants, polycondensation catalyst and water at a temperature of from ambient to about 50° C. In some instances, particularly when employing relatively large quantities of reagents or ones which are not readily emulsifiable, it may be desirable to employ a mechanical homogenizer or an ultrasonic device such as a sonic cell disruptor to prepare the emulsion.

Polymerization of the emulsified reactants is accomplished by maintaining the emulsion at a temperature of from about 1° C. to the boiling point for a period of time sufficient to achieve a substantially complete reaction or an equilibrium distribution of molecular weight. Depending upon the reactants and the temperature of the reaction mixture, the reaction time required will be from several minutes to 24 hours or more. The only precaution to be observed is that the reagent or reagents employed must be emulsifiable at the reaction temperature. So long as this criterion is met, any reaction temperature from above the freezing point, preferably above about 1° C., up to the boiling point of the aqueous phase can be employed. If the polymerization is conducted at superatmospheric pressure, the boiling point can be as high as 374° C. Normally, the temperature employed will be from 1° to 100° C., preferably from ambient to about 95° C.

Other criteria which determine the temperature range for a given polymerization reaction are the melting and/or boiling points of the reagents.

When employing diols and/or carbonyl compounds containing fewer than 10 carbon atoms, some of which may be appreciably soluble in water, the temperature of the emulsion is preferably maintained at from 1° to about 40° C. Above about 40° C. the solubility of these reagents in the aqueous phase may increase to the extent that their concentration in the oil phase is insufficient to achieve any significant degree of polymerization. In some instances, a reversion of already formed polymer to water soluble monomers and oligomers may occur.

Since all of the reagents must be emulsifiable liquids during the polymerization reaction, the temperature at which this reaction is conducted should preferably be above the melting point of at least one of the reagents and at a level where all reagents are at least partially soluble in the oil phase. The optimum temperature range for a given polymerization can readily be determined by routine experimentation.

It has been found that some of the polyacetals and polyketals of this invention are susceptible to hydrolysis and trans-acetalization or trans-ketalization in acidic media. Since many of the catalysts and surfactants that can be employed to prepare the polyacetals and polyketals are acids or have pH values lower than 7 in water, the reaction mixture should preferably be neutralized to a pH value of from 7 to 9 following completion of the polymerization reaction. This is conveniently accomplished by addition of a relatively dilute aqueous solution of an alkali metal hydroxide or ammonium hydroxide to the reaction mixture. The concentration of hydroxide ion in the neutralization reagent is preferably from about 0.01 to 1 equivalent per mole.

Theoretically the yield and molecular weight of polyacetal or polyketal should be maximized when the reagents employed to prepare the polymer are present in substantially stoichiometric amounts in the initial reaction mixture. It may be desirable to use this principal as a guide when determining the optimum relative concentrations of reactants for preparing a given polymer.

The progress of the polymerization can conveniently be followed by periodic analysis of the reaction mixture using infra-red spectroscopy and noting the decrease in the area of the absorption plot at point of maximum absorption characteristic of the carbonyl group.

Polymers containing more than about 3 repeating units per molecule are generally insoluble in methanol at ambient temperature whereas the other components of the reaction mixture are soluble. The presence of a solid precipitate following the addition of methanol to a sample of the reaction mixture provides a qualitative means for determining whether a useful polymer has been formed.

Some emulsions produced using the method of this invention remain stable only so long as the number average molecular weight of the polymer being formed is relatively low. Once this level is exceeded, the emulsion may spontaneously break and the polymer precipitates from the reaction mixture. It has been found that the molecular weight at which precipitation occurs can be substantially increased by including an effective amount of a surfactant in the initial reaction mixture. The surfactant can be of the anionic, nonionic or cationic type, however anionic surfactants are preferred because they do not substantially decrease the rate of polymerization as do representative cationic and nonionic surfactants. Since many of the conventional anionic surfactants, such as dodecylbenzenesulfonic acid and the sodium salt of this acid, are also effective catalysts for emulsion polymerizations in accordance with the present invention, by increasing the concentration of these surfactants sufficiently to stabilize the emulsion these compounds can function as both catalysts and emulsion stabilizers.

The relative concentration of surfactant is not critical, however it is usually preferred to employ at least 0.1% of surfactant based on the weight of the polycondensation catalyst. Using an excessive amount of surfactant may yield no appreciable additional benefits, and the large amount of surfactant may cause excessive foaming and an increase in viscosity of the reaction mixture.

The polyacetals and polyketals produced using the emulsion polymerization method of this invention contain an average of up to 20 or more repeating units per molecule. While not wishing to be bound to any theory concerning the structure of the polymers, it is believed that the repeating units of polymers derived from monofunctional carbonyl compounds correspond to the general formula

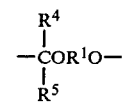

and the repeating units of polymers derived from polyfunctional carbonyl compounds corresponding to the formula

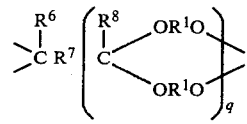

The definitions for $R^1$, $R^4$, $R^5$, $R^6$, $R^7$, $R^8$ and q appear in the preceding portion of this specification.

If the polyfunctional alcohol is a polymer containing a multiplicity of pendant hydroxyl groups and the polymer is reacted with a monofunctional aldehyde or ketone, at least some of the repeating units of the resultant product may correspond to the formula

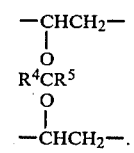

Such a structure would result from the reaction of an aldehyde or ketone of the formula $R^4R^5C=O$ with one hydroxyl group on each of two polymer molecules having a repeating unit

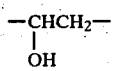

Alternatively, the carbonyl compound could react with two hydroxyl groups on the same polymer to yield a cyclic structure such as

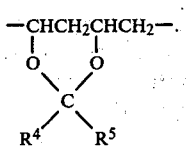

Polyacetals and polyketals prepared using the method of this invention are useful for a variety of applications, including plasticizers for polyvinyl chloride and related vinyl polymers, protective coatings, and as substrates for controlled release of various materials such as fungicides, fertilizers, etc.

Polyacetals and polyketals containing hydroxyl end groups can be reacted with a di- or polyfunctional isocyanates to yield modified cellular or elastomeric polyurethanes which, in turn, are useful as insulating and cushioning material and as the film-forming component of coating compositions.

Depending upon the desired application, polymers prepared in accordance with the present invention can be combined with various additives, including pigments, organic or mineral fillers such as carbon black and calcium carbonate, stabilizers and antioxidants. If the polymer emulsion is to be employed as an aqueous coating formulation, the final emulsion can be combined with the other components of the formulation without having to precipitate the polymer. If it is desired to precipitate the polymer, this is conveniently accomplished by the addition of a water-miscible nonsolvent such as methanol to the aqueous emulsion.

The following examples disclose preferred embodiments of the present invention and should not be interpreted as limiting the scope of the invention as defined in this specification and the accompanying claims. All parts and percentages are by weight unless otherwise specified.

EXAMPLE 1

Preparation of A Polyacetal From 1,10-decanediol And n-heptaldehyde

A reactor was charged with 17.4 g (0.1 mole) of 1,10-decanediol, 11.40 g (0.1 mole) of n-heptaldehyde, and the amounts of water and catalyst set forth in the following table. The resultant mixture was heated at a temperature of 50° C. for 1 hour with stirring, after which heating was discontinued and stirring continued for an additional 24 hours, at which time the initial emulsion had coagulated. The solid material in the reactor was isolated by filtration, dried, combined with 50 cc of methanol and allowed to stand for one week. The solid material was then recovered, dried and weighed to determine the yield of methanol insoluble polymer. This figure is reported in the accompanying Table 1.

Using dodecylbenzenesulfonic acid as the catalyst, the foregoing polymerization reaction was repeated; however just prior to the initial isolation of the polymer, the pH of the reaction mixture was adjusted to 8.8 by addition of a 0.1 N aqueous solution of sodium hydroxide. In this instance, considerably less of the polymer reverted to low molecular weight material that dissolved while the polymer was stored for one week in the presence of methanol, and the yield of methanol-insoluble material was 65% compared to 4% from the unneutralized reaction mixture.

TABLE 1

| Sample No. | Catalyst (g.) | Water (g.) | Yield of Insoluble Polymer % | Molecular Weight[e] |
|---|---|---|---|---|
| 1 | DBSA[a] (1.0) | 130 | 4[b], 64.7[c] | 2293[b], 2892[c] |
| 2 | NaDBSA[d] (1.12) | 130 | 61.8[b] | 2825[b] |
| 3 | H$_2$SO$_4$ (1.67) | 131.5 | 48.5 | 2856[c] |

[a]DBSA = dodecylbenzenesulfonic acid
[b]Reaction mixture not neutralized.
[c]Reaction mixture neutralized to pH of 8-9 using 0.1N aqueous sodium hydroxide solution
[d]NaDBSA = sodium dodecylbenzene sulfonate.
[e]Number average molecular weight determined using gel permeation chromatography The foregoing data demonstrate that neutralization of the reaction mixture following completion of the polymerization is necessary to prevent substantial polymer degradation in the presence of monofunctional alcohols.

EXAMPLE 2

Reaction of Emulsified Vinyl Acetate/Ethylene Copolymer with Heptaldehyde

A reactor equipped with a mechanically driven agitator was charged with 54.51 g of an aqueous emulsion containing 55% by weight of a copolymer of vinyl acetate and ethylene, available as Elvace ® 1875 from E. I. DuPont deNemours and Co., Wilmington, Del., and 0.55 g of dodecylbenzenesulfonic acid. The resultant mixture was stirred for 20 hours at ambient temperature, at which time 7.28 g of n-heptaldehyde were added to the reactor. Stirring of the reaction mixture was continued for an additional 20 hours at ambient temperature. The emulsion had not coagulated. A coherent film of the emulsion was then cast onto an aluminum panel. Following evaporation of the liquid present the film could be removed from the plate and stretched to about twice its original length. The film returned to substantially its original dimensions once the stretching force was removed. A similar film formed from the initial copolymer prior to reaction with the aldehyde did not exhibit any tendency to contract to its original dimensions after being stretched. The elasticity exhibited by the film following reaction with n-heptaldehyde indicated that some cross-linking of the polymer had occurred as the result of reaction with the aldehyde.

EXAMPLE 3

Reaction of n-heptaldehyde and a Hydroxyl-terminated Urethane Oligomer

A prepolymer was prepared by combining 17.2 g (0.1 mole) toluene diisocyanate (a commercially available mixture of the 2,4- and 2,6-isomers), 21.0 g (0.339 mole) ethylene glycol and 0.3 g stannous octoate as the catalyst. The resultant mixture was stirred from 24 hours. A 12.83 g portion of this reaction product, 6.29 g of n-heptaldehyde and 0.94 g dodecylbenzenesulfonic acid were dispersed in 15.18 g of distilled water and the resultant mixture was stirred at room temperature for 24 hours. The solid present in the final reaction mixture was dried and allowed to stand in contact with 50 cc of methanol for one week. The solid material present at this time was isolated, dried and weighed. The yield of methanol-insoluble material was 14% of the calculated value, based on the weights of reagents. The number average molecular weight of this material, determined using gel permeation chromatography, was 1864. The molecular weight of the prepolymer was too low to be measured by gel permeation chromatography.

EXAMPLE 4

Preparation of a Polyketal from 3-Heptanone and 1,10-Decanediol

A reactor was charged with 11.4 g (0.1 mole) of 3-heptanone, 17.4 g (0.1 mole) of 1,10-decanediol, 3.14 g dodecylbenzenesulfonic acid and 77 g water. The resultant emulsion was heated at 50° C. with stirring for 1 hour, at which time heating was discontinued. After being stirred for an additional 24 hours the emulsion was neutralized to a pH of 7 using 0.1 N aqueous sodium hydroxide, then poured into a large excess of methanol. The amount of insoluble material in the methanol was equivalent to a 45% yield of polymer.

That which is claimed is:

1. A method for preparing polyacetals and polyketals by emusion polymerization, said method comprising the steps of
   (1) emulsifying in an aqueous medium a mixture comprising
      (a) at least one reagent containing at least 5 carbon atoms and 2 or more hydroxyl groups or 2 or more esterified hydroxyl groups of the formula RCOO— where R is alkyl and contains from 1 to 3 carbon atoms and the hydroxyl or esterified hydroxyl groups are bonded to aliphatic or cycloaliphatic carbon atoms,
      (b) at least one carbonyl compound containing at least 5 carbon atoms or a reaction product of said carbonyl compound and a water-soluble monofunctional alcohol containing from 1 to 3 carbon atoms, said carbonyl compound being selected from the group consisting of mono- and polyfunctional aldehydes and mono- and polyfunctional ketones wherein the carbonyl groups of the carbonyl compound are bonded to aliphatic or cycloaliphatic carbon atoms, and
      (c) at least one polycondensation catalyst in an amount effective to accelerate the rate of reaction of (a) with (b), and
   (2) thereafter allowing (a) and (b) to react until the desired product is obtained.

2. A method according to claim 1 wherein said mixture constitutes from 5 to 80% of the total weight of the mixture and said aqueous medium.

3. A method according to claim 2 wherein said mixture constitutes from 40 to 80% of the total weight of the mixture and said aqueous medium.

4. A method according to claim 1 wherein the reaction of components (a) and (b) is conducted at a temperature of from 1° C. to the boiling point of the reaction mixture.

5. A method according to claim 4 wherein said reaction is conducted at a temperature of from 1° to 40° C.

6. A method according to claim 1 wherein the reaction mixture is neutralized to achieve a pH value of from 7 to 9 following completion of the reaction of components (a) and (b).

7. A method according to claim 1 wherein the concentration of said polycondensation catalyst in the reaction mixture is from 0.01–30%, based on the combined weight of components (a) and (b).

8. A method according to claim 7 wherein the concentration of polycondensation catalyst is from 0.1 to 20%.

9. A method according to claim 8 wherein the concentration of polycondensation catalyst is from 0.5 to 10%.

10. A method according to claim 1 wherein component (a) is represented by the formula HOR$^1$OH where R$^1$ represents hydrocarbylene, substituted hydrocarbylene or a series of at least two hydrocarbylene groups joined by a linking group of the formula

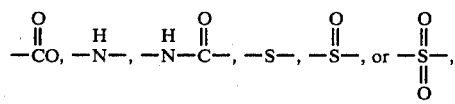

with the proviso that R$^1$ contains at least 5 carbon atoms and is bonded to at least two hydroxyl groups through aliphatic or cycloaliphatic carbon atoms.

11. A method according to claim 10 wherein R$^1$ represents unsubstituted or substituted alkylene containing from 5 to 20 carbon atoms; unsubstituted or substituted alkenylene containing from 5 to 20 carbon atoms; unsubstituted or substituted cycloalkylene containing from 5 to 8 carbon atoms; —C$_m$H$_{2m}$DC$_n$H$_{2n}$, where D represents cycloalkylene containing from 5 to 8 carbon atoms or arylene, and m and n are individually selected integers from 1 to 8; or

where R$^2$ represents alkylene containing from 2 to 20 carbon atoms, R$^3$ represents hydrocarbylene containing from 2 to 20 carbon atoms and r is an integer from 1 to 20.

12. A method according to claim 11 where R$^1$ represents alkylene containing from 8 to 20 carbon atoms.

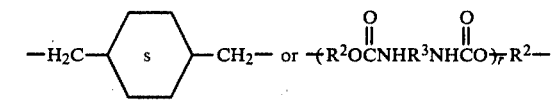

where R$^2$ represents alkylene containing from 2 to 12 carbon atoms and R$^3$ represents alkylarylene.

13. A method according to claim 12 wherein R$^3$ represents o- or p-tolylene.

14. A method according to claim 10 wherein component (a) is selected from the group consisting of 1,6-hexandiol, 1,8-octanediol, 1,10-decanediol, 1,12-dodecanediol, the isomeric cyclohexanediols, 1,2- and 1,4-bis(hydroxymethyl)cyclohexane, 1,2- and 1,4-benzenedimethanol, pentaerythritol, dipentaerythritol, mannitol, sorbitol, oligomeric reaction products of styrene and allyl alcohol and homopolymers of vinyl carboxylates wherein the carboxylic acid residue contains from 1 to 3 carbon atoms and copolymers of said vinyl carboxylates with ethylene or styrene.

15. A method according to claim 1 wherein the carbonyl compound (b) is represented by the formula

where $R^4$ represents hydrocarbyl or substituted hydrocarbyl; $R^5$, $R^6$ and $R^8$ are individually selected from the group consisting of hydrogen, hydrocarbyl and substituted hydrocarbyl; $R^7$ represents hydrocarbylene, and q represents an integer having a value of at least 1, with the proviso that said carbonyl compound contains at least 5 carbon atoms and the carbonyl groups are bonded to aliphatic or cycloaliphatic carbon atoms.

16. A method according to claim 15 wherein q has a value of 1, $R^4$ represents unsubstituted or substituted alkyl containing from 1 to 20 carbon atoms, unsubstituted or substituted alkenyl containing from 2 to 20 carbon atoms or unsubstituted or substituted cycloalkyl containing from 5 to 8 carbon atoms; $R^5$, $R^6$ and $R^8$ are individually selected from the group consisting of hydrogen and $R^4$; and $R^7$ represents unsubstituted or substituted alkylene containing from 1 to 20 carbon atoms.

17. A method according to claim 16 wherein $R^4$ represents alkyl containing from 2 to 20 carbon atoms or alkenyl containing from 2 to 20 carbon atoms, with the proviso that $R^4$ contains more than 3 carbon atoms when $R^5$ represents hydrogen; $R^5$ represents hydrogen or is selected from the same group as $R^4$; and $R^7$ represents alkylene containing from 6 to 20 carbon atoms.

18. A method according to claim 17 wherein $R^4$ represents alkyl containing from 4 to 12 carbon atoms and $R^7$ contains from 6 to 12 carbon atoms.

19. A method according to claim 15 wherein component (b) is selected from the group consisting of pentanal, hexanal, heptanal, 2,4-hexadien-1-al, decanal, eicosanal, cyclohexanal, diphenylacetaldehyde, cinnamaldehyde, isomeric hexanedials, decanedials, cyclohexanedials, 2- and 3-pentanone, cyclohexanone, 2,4-pentanedione, 2,3-hexanedione, 1,4-cyclohexanedione and 3-ethyl-5,5-dimethyl-2,4-oxazolidinedione.

20. A method according to claim 1 wherein said polycondensation catalyst (c) is selected from the group consisting of hydrochloric acid, sulfuric acid, nitric acid, phosphoric acid, sulfonic acids, mono- and diesters of sulfuric acid, alkali metal salts of sulfuric acid monoesters wherein the alcohol residue contains at least 12 carbon atoms, alkali metal salts and esters of sulfonic acids, and mixtures comprising (a) a first component selected from the group consisting of mono- and diesters of sulfuric acid, alkali metal salts of sulfuric acid monoesters wherein the alcohol residue contains at least 12 carbon atoms and cationic surfactants and (b) a second component selected from the group consisting of alkali metal salts of sulfuric acid.

21. A method according to claim 20 wherein the polycondensation catalyst is selected from the group consisting of sulfuric acid, hydrochloric acid, phosphoric acid, aliphatic and aromatic sulfonic acids, mono- and diesters of sulfuric acid, alkali metal salts of aromatic sulfonic acids, and mixtures containing an alkali metal salt of sulfuric acid and a cationic surfactant.

22. A method according to claim 20 wherein the polycondensation catalyst is selected from the group consisting of dodecylbenzenesulfonic acid, lauryl hydrogen sulfate, sodium lauryl sulfate, sodium p-dodecylbenzene sulfonate, p-toluenesulfonic acid, trifluoromethanesulfonic acid, 5-methylnaphthylenesulfonic acid, dodecyl diphenyl oxide sulfonic acid, hydrochloric acid, sulfuric acid and phosphoric acid.

23. A method according to claim 1 wherein component (a) is selected from the group consisting of 1,10-decanediol, copolymers of ethylene and vinyl acetate and reaction products of ethylene glycol and toluene diisocyanate, component (b) is selected from the group consisting of n-heptaldehyde and 3-heptanone and the polycondensation catalyst is selected from the group consisting of dodecylbenzenesulfonic acid, sodium dodecylbenzene sulfonate and sulfuric acid.

24. The product produced according to the method of claim 1.

25. The product produced according to the method of claim 10.

26. The product produced according to the method of claim 11.

27. The product produced according to the method of claim 12.

28. The product produced according to the method of claim 14.

29. The product produced according to the method of claim 15.

30. The product produced according to the method of claim 16.

31. The product produced according to the method of claim 17.

32. The product produced according to the method of claim 18.

33. The product produced according to the method of claim 19.

34. The product produced according to the method of claim 20.

35. The product produced according to the method of claim 21.

36. The product produced according to the method of claim 22.

37. The product produced according to the method of claim 23.

* * * * *

UNITED STATES PATENT AND TRADEMARK OFFICE
CERTIFICATE OF CORRECTION

PATENT NO. : 4,374,953
DATED : February 22, 1983
INVENTOR(S) : Yungnien J. Chou, John C. Saam It is certified that error appears in the above-identified patent and that said Letters Patent is hereby corrected as shown below:

In column 1, line 17, "it it possible" should read -- it is possible --.

In column 6, line 7, "1,4-benx-" should read -- 1,4-benz- --.

In column 7, line 6, "form" should read -- from --.

In column 9, line 7, "one of two" should read -- one or two --.

Signed and Sealed this

Twenty-second Day of January 1985

[SEAL]

Attest:

DONALD J. QUIGG

*Attesting Officer*   *Acting Commissioner of Patents and Trademarks*